United States Patent [19]
Cope et al.

[11] 3,731,914
[45] May 8, 1973

[54] DOUBLE ENDED SPRING SHOCK ABSORBER

[75] Inventors: Geoffrey Wilton Cope, Williamsville; Loren William Smith, Eggertsville, both of N.Y.

[73] Assignee: Dresser Industries, Inc., Dallas, Tex.

[22] Filed: Mar. 18, 1971

[21] Appl. No.: 125,669

[52] U.S. Cl. .................................................267/65 R
[51] Int. Cl................................................F 16f 5/00
[58] Field of Search ..........................267/65 R, 65 A

[56] References Cited

UNITED STATES PATENTS 3,307,883  3/1967  Wastenhagen et al..............267/65 R

FOREIGN PATENTS OR APPLICATIONS 214,268  4/1924  Great Britain..........................267/65

Primary Examiner—James B. Marbert
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

Double ended spring shock absorber consisting of a cylinder having pistons reciprocable therethrough at each end and a compressible material disposed between the end plugs within the cylinder.

9 Claims, 1 Drawing Figure

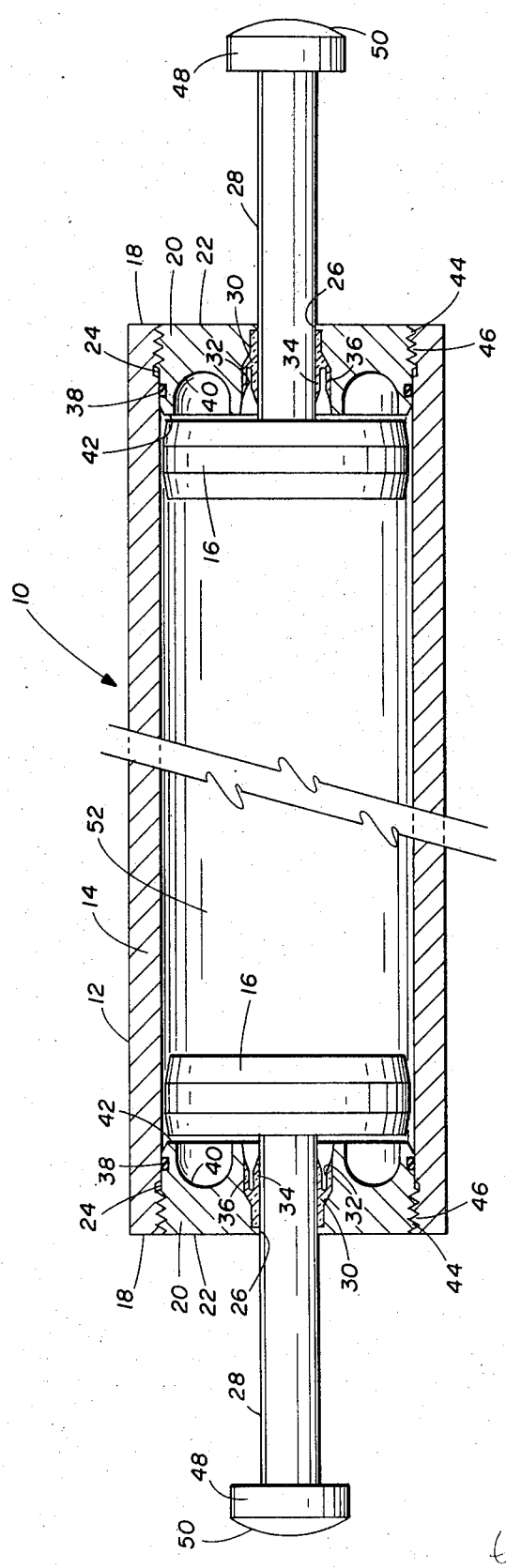

DOUBLE ENDED SPRING SHOCK ABSORBER

Heretofore, springs, generally known as liquid and compressible solid springs, have been suggested for various applications where mechanical springs, such as, coil or leaf springs have been used and in applications where mechanical springs could not be used because of their physical limitations. In a liquid or solid spring, a lightweight piston is accelerated when the spring is actuated, whereas in a mechanical spring, the entire mass of the spring is moved to some degree each cycle so that the natural frequency of a liquid or solid spring is much higher than a coil spring, enabling it to be operated at much higher velocities. A liquid or solid spring is much more compact and much smaller than a mechanical spring which will carry the equivalent load. Conversely, a liquid or solid spring of a given size will carry many times the load of the same size mechanical spring.

Liquid or solid springs have been used between two relatively moveable parts, the container being connected to one of these parts and the piston being connected to the other. When a force or load is applied to one of the two relatively moveable parts, the piston is forced inwardly of the container, compressing the medium within the container. When the force or load is relieved, the liquid or solid expands returning the piston, and the part, to which it is connected, to its initial position.

These single ended pistons have been suggested for use in automobile underframing for cushioning of the bumper; in aircraft landing gear; in artillary gunnery mechanisms; in end-of-car cushioning units for railway cars; and other environments. The liquid spring units are generally designed to accommodate a force against the piston head. The piston head is generally of small diameter with respect to the cylinder diameter; therefore, it offers little resistance to the passage of liquid past it. Certain applications have required the accommodation of a great force or shock causing design and materials problems with single ended springs. It has been suggested to place two single ended liquid springs back to back. However, such a solution presents mechanical problems and reduces the efficiency of each individual unit along with lost economy.

Accordingly, it is an object of the present invention to provide a double ended spring shock absorber.

Another object of the invention is to provide a spring shock absorber containing a piston at each end thereof which individually travel less distance than the piston of a single ended liquid spring of the prior art.

A further object of the invention is to provide a spring shock absorber in which two pistons act against each other within a cylinder through a compressible medium.

In order to more fully understand the nature and scope of the present invention, reference should be had to the following detailed description and drawing, the single FIGURE of which is a partial cross sectional view of a preferred construction for the double ended spring shock absorber of the present invention.

In accordance with the present invention, there is provided a double ended spring shock absorber comprising an open ended tubular member. A piston is disposed and reciprocable within each end of the tubular member and contains a rod which extends externally thereof. A closure plug is fixedly attached to each end of the tubular member and accommodates the piston rod which passes therethrough. A compressible material is disposed within and fills the tubular member between the closure plugs.

Compressible liquids suggested in the prior art are oil, water, alcohol, etc. However, silicone fluids are preferred. Compressible solid materials that may be utilized are plastic, such as, a dense and hard silicone or other materials, such as polystyrene, cellulose acetate, nylon, etc., depending on the loads desired. The spring is preloaded by precompressing the compressible material when filling the chamber of the cylinder. When a working load is applied to either end of the spring, the material is compressed to absorb the load against the other piston and returns the loaded piston by increase in volume when the load is relieved.

A single ended liquid spring, liquid spring shock absorber or compressible solid spring shock absorber requires a piston rod of a certain length to provide the necessary travel. The column strength of the outstanding piston rod is determined by its length, its radius of gyration, the amount of initial eccentricity and the material properties. The further the piston rod stands out from the cylinder the larger the diameter must be to resist the greater initial eccentricity and the consequently larger buckling loads. Inspection of any of the column formulas will readily show the relationship between the column length and the radius of gyration or indirectly piston diameter.

Since the liquid spring shock absorber rate is completely dependent upon the volume of the piston rod that is introduced into the cylinder during compression, it follows that the larger the diameter of the rod the higher the spring rate and the shorter the allowable travel, or conversely, the larger the piston diameter the greater the volume of liquid required to provide the required level because of the limited compressibility of the liquid (approximately 8 percent). Thus, there is a tie-in between the piston rod length and travel, its diameter and the volume of the cylinder or container.

The double ended cylinder first of all reduces the outstanding length of the piston rod by one-half and thereby permits its diameter to be reduced. The piston rod volume that enters the cylinder for a given travel is likewise reduced along with the volume of liquid necessary to keep the compression below the maximum allowable. It provides a means to reduce the size of the cylinder or container and/or the spring rate and/or the pressure gradiant during closure compared to a single ended unit.

One other factor is the hoop strength of the cylinder wall and therefore the material that can be used. If the pressure can be kept down either by use of a smaller diameter piston rod or by a larger volume of liquid, then lower strength materials can be utilized for the cylinder which usually reflects a lower cost.

Referring to the drawing, there is shown a double ended spring 10 according to an embodiment of the invention. It includes a cylinder or tube 12, the wall 14 of which is preferably of substantially uniform diameter from end to end. The tube operatively supports pistons 16 which are reciprocable axially thereof and relative thereto.

The opposite initially open ends 18 of the tubular wall 14 are closed by a plug 20. The plug 20 has an end wall 22 and a sidewall 24 that decreases in thickness internally of the tubular member. The plug has a central aperture divergingly tapered toward the inside of the cylinder 12. The tapering surface provides a space between a portion of the aperture and a piston rod 28 attached to the pistons 16 for disposing a sealing means 30 to prevent loss of the compressible material. As shown in the drawing, the sealing means 30 contains an annular groove 32 therein providing two lips 34 and 36 for sealing the piston rod 28 and aperture surface of the closure plug. The outer periphery 24 of the closure plug contains an annular O-ring 38 embedded therein for sealing the closure plug against the inner surface of the cylinder. The seals may be composed of a plastic yieldable material, such as, Teflon, nylon, Delrin or other materials well known to those skilled in the art. The closure plug also contains an annular depression 40 on the internal end 42 thereof to provide a flow path for the compressible material. Variations, of course, can be made in the closure plug design and the sealing members. The closure plug is attached to the tubular member by means of a threaded portion 46 on the internal surfaces of the tube. However, the closure plug may be secured therein by lock rings, swaging, welding, brazing and the like.

The piston rods contain a terminal head 48 which has a hemispherical outer surface 50. The spherical surface is preferred for achieving equalization of the piston when in use. The compressible material 52 fills the space in the form of a column between the closure plugs at each end.

While it is preferred that the tubular member be of uniform cross section, certain applications may require that the cross sections of each end of the tube and the accompanying pistons vary, i.e., by gradual tapering. In addition, the design shown in the drawing is particularly applicable to compressible liquids. With compressible solids, the piston would have to be of slightly smaller diameter to permit extrusion of the solid past it.

The important aspect of design with respect to the piston diameter and cylinder diameter for spring shock absorbers as contrasted with liquid springs is that sufficient tolerance between the piston and cylinder must be maintained to permit resistant passage of the compressible material past the piston. Impact forces cause the piston rod 28 and the piston 16 to move inwardly of the chamber. During such movement, the compressible solid or liquid 52 is forced through the annular orifice surrounding the piston, thereby producing a throttling effect. Also, as the piston rod moves inwardly of the chamber, the volume of the compressible material 52 is reduced thereby increasing the pressure therein. The described throttling effect and volume-pressure change of the compressible material serve to dissipate the energy of impact forces received by the piston rod. When the impact forces are removed, the effective pressure of the compressible material 52, which is unbalanced on opposite sides of the piston due to the differential in areas thereof, causes the piston and piston rod to return to the position shown in the drawing. During the return stroke of the piston rod, the compressible material flows back through the annular orifice surrounding the piston 48 to fill the space being vacated by the latter.

The drawings show that the pistons are identical in configuration. However, within the scope of this invention, the pistons may vary in size and configuration within the uniform diameter cylinder to develop, for example, a two stage compression curve.

Various other modifications may be made herein without departing from the spirit and scope of the present invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. A double ended spring shock absorber comprising an open ended tubular member, a piston reciprocable through each end of the tubular member and containing a rod extending externally thereof, there being an annular oriface between the piston and tubular member, a closure plug fixedly attached to each end of the tubular member, the piston rod extending therethrough, and a compressible material disposed within and filling the tubular member between said closure plugs.

2. The spring of claim 1, in which the compressible material is precompressed within the tubular member to effectively preload the double ended spring.

3. The spring of claim 1, in which the compressible material is a silicone fluid.

4. The spring of claim 1, in which a sealing means is provided between the closure plug and the tubular member.

5. The spring of claim 1, in which the closure plug contains an annular depression internally of the tubular member.

6. The spring of claim 4, in which the sealing means between the rod and closure plug contains an annular depression internally of the tubular member.

7. The spring of claim 1, in which the rod extending externally of the cylinder terminates in head having a hemispherical surface.

8. The spring of claim 1, in which the tubular member is of substantially uniform diameter.

9. The spring of claim 1, in which the pistons reciprocable through each end of the cylinder are of different configuration.

* * * * *